Dec. 29, 1936. J. H. ROETHEL 2,066,056
WINDOW REGULATOR
Filed July 25, 1934
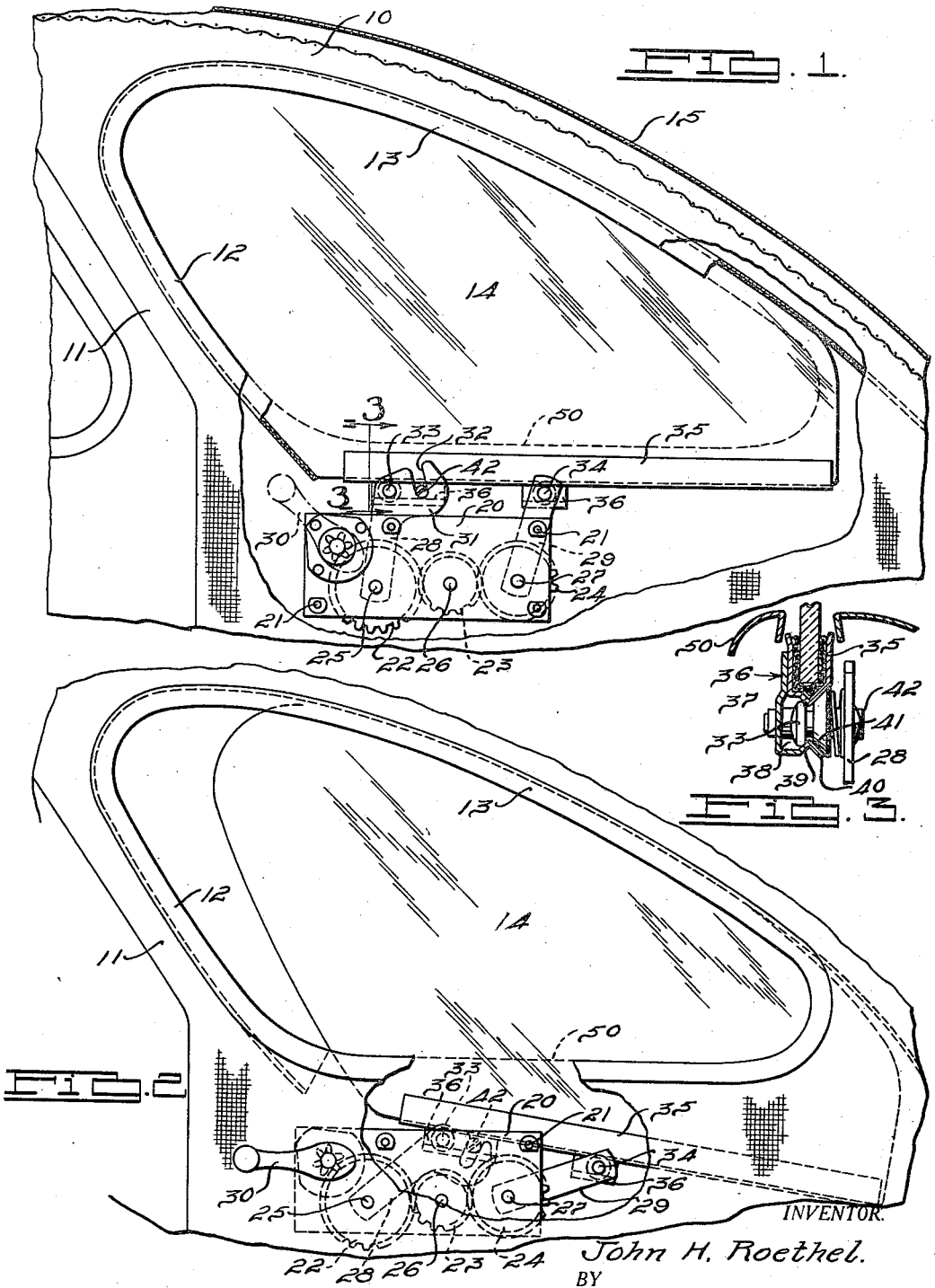
INVENTOR.
John H. Roethel.
BY
Dike, Calver & Gray
ATTORNEYS.

Patented Dec. 29, 1936

2,066,056

UNITED STATES PATENT OFFICE 2,066,056

WINDOW REGULATOR

John H. Roethel, Detroit, Mich.

Application July 25, 1934, Serial No. 736,807

6 Claims. (Cl. 296—44)

This invention relates to ventilating window structures for vehicle bodies and especially, although not exclusively, to improved means for mounting and operating the rear quarter window of an automobile body having streamlined characteristics.

One of the objects of the invention is to provide a window structure and window regulator mechanism designed and operative to swing the window downwardly and rearwardly in such manner as to provide a ventilating slot between the forward edge of the window glass and the adjacent frame, whereby air may be withdrawn by suction from the body during the forward travel of the vehicle.

Another object of the invention is to provide a ventilating window structure especially desirable for streamlined rear quarters of automobiles and wherein the window glass may be shifted rearwardly away from the front edge of the window frame to provide a vertical or upright ventilating slot, without, however, requiring the glass to travel rearwardly beyond the necessary limit of the window frame glass channel when the window is fully closed.

By virtue, therefore, of the improved construction, the sloping rear edge of the window frame may follow the slope of the roof and extend in close proximity thereto, since the depth of penetration of the glass in the glass channel along said edge remains substantially constant, the glass being shifted in a path corresponding to the inclination of the window frame.

Other objects and advantages of the invention will appear from the following description and appended claims when considered in connection with the accompanying drawing forming a part of this specification wherein like reference characters designate corresponding parts in the several views.

In said drawing:

Fig. 1 is a fragmentary side elevation, partly broken away, of a rear quarter panel of a streamlined automobile body embodying the present invention, with the window glass in fully closed position.

Fig. 2 is a view similar to Fig. 1, showing the window glass in ventilating position; and Fig. 3 is a detail vertical section taken substantially along the line 3—3 of Fig. 1, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is illustrated, by way of example, a rear quarter body panel of a closed automobile body of streamlined design. The body panel is provided with a window opening having a glass panel mounted therein and adapted to be tilted or shifted in its plane rearwardly and downwardly into ventilating position, and to be moved in the reverse direction into closed position, by a regulator mechanism located within the well of the rear quarter paneling. When open, the space between the forward edge of the window glass and the adjacent pillar provides a ventilating slot.

As illustrated in the drawing, the rear quarter body panel 10 is provided with a window opening and a front pillar 11. The framing of the window opening in part is in the form of a closed window glass channel having a forward upright portion 12 carried by the pillar and an upper rearwardly sloping portion 13 within which the correspondingly shaped edges of the glass panel 14 are confined when the glass is in position to fully close the window opening. It will be noted that the roof 15 of the body slopes rearwardly and downwardly and that the window opening and the glass panel correspond to the inclination thereof.

Where, as in the present instance, there is very little space between the upper section 13 of the closed glass channel and the roof or top 15, it is impossible to provide a ventilating slot at the forward edge of the window glass by sliding the glass rearwardly in a horizontal plane, this being due, of course, to the streamlining of the body and the proximity of the roof line. In accordance with the present invention, however, I have made it possible to produce such a ventilating slot in a streamlined body of the foregoing type by shifting the glass panel rearwardly and downwardly so that it follows a path corresponding substantially to the inclination of the window frame and roof line. To accomplish the necessary shifting of the window glass there is provided, by way of illustration, one form of window regulator mechanism suitable for this purpose. In the present instance such mechanism comprises a mounting plate 20 secured by screws or the like 21 to the inside of the rear quarter panel. The plate 20 carries a series of preferably three gears 22, 23 and 24 journaled on the plate in intermeshing relation by means of pivots 25, 26 and 27, respectively. Secured to the pivot 25 is a swinging arm 28 and secured to the pivot 27 is a swinging arm 29, these arms being adapted to be swung in the same general direction upon rotation of the gears through the medium of the crank or handle 30.

The outer end of the arm 28 is provided with an enlarged offset portion or extension shown as a whole at 31, said extension having formed therein a cam slot 32 open at its upper end. Secured to the extension 31 is a stud or button-like device 33 and secured to the outer end of arm 29 is a similar stud or button-like device 34, each having a shank riveted to the arm. Along the lower edge of the glass panel 14 there is fastened a felt lined channel 35. A pair of longitudinally spaced plates 36 are preferably spot welded to one face of the channel 35, see Fig. 3, and have depending walls forwardly flanged at 37 along their lower edges to provide, with the lower edge of the channel 35, runways 38 for the studs 33 and 34. A single runway, of course, can be provided if desired. Each runway has a constricted neck 39 forming upper and lower tapered faces engaging the tapered sides of the studs 33 and 34 and the members 35 and 36 which together form the glass retainer member, have outwardly flared bearing portions 40, engaged by conical spring pressed washers 41 guided by the studs 33 and 34.

From this construction it will be seen that when the arms 28 and 29 are swung about their respective pivots 25 and 27, the studs 33 and 34 will slide horizontally in the runways or camways 38 and thus shift the window glass 14 from closed to ventilating position, or vice versa. It is to be noted that the felt lined channel 35, when in its horizontal position, Fig. 1, is located immediately below the window sill 50.

Referring particularly to Fig. 1, it will be seen that the plate 36 which cooperates with stud 33 carries a fixed stud 42 which is threaded into its depending wall and is located within the cam slot 32. Thus the stud 32 cooperates with the cam slot and acts not only as a stop to limit the travel of the window when it has reached its fully open position but also as a third point of support for the glass to assist in holding the glass rigid when in various open positions.

Referring particularly to the train of gearing, the gear 24 has a smaller diameter than the gear 22 and thus will travel faster than the gear 22 upon revolution of the gear train by the crank handle 30. The arm 29 thus moves faster than the arm 28 and tends to tilt the window glass downwardly as the glass is being shifted from closed to ventilating position, the upper edge of the glass riding in the curved glass channel section 13 and following a path corresponding to the inclination of the said channel and the inclination of the roof 15. When the glass is shifted from ventilating position, in which position it is shown in Fig. 2, to the fully closed position of Fig. 1, the gear 24 and arm 29 likewise move faster than the gear 22 and arm 28 and thus shift the glass and retaining channel from an angular to a horizontal position.

To assemble the regulator mechanism with the glass retaining channel 35, the arms 28 and 29 are swung about their pivots bringing the studs 33 and 34 horizontally into the guideway 38, whereupon the fixed stud 42 is screwed into place within the cam slot 32. This latter stud, in addition to serving as a stop at the end of the movement of the window glass, likewise serves to prevent the parts from being disconnected during operation.

It will be understood that the window pillar 11 at the front edge of the window juts out slightly beyond the outer face of the rear quarter panel to form a projection or baffle to provide a low pressure zone immediately behind and adjacent it, so that when the window glass is shifted to open position suction is created to withdraw air from within the body through the slot.

While I have shown one form of window regulator mechanism, various other regulator mechanisms may be adopted for shifting the glass 14, such for example as the parallel arm type of regulator shown in my prior Patent No. 1,931,738, issued October 24, 1933, by simply shortening one of the parallel arms to cause a shifting of the T-bar, connected to the outer ends of said arms, from a horizontal position to an angular position.

I claim:

1. In a vehicle body having a side window opening, a window glass mounted therein, and regulator means for swinging said glass in a downward direction to provide a ventilating slot at the forward upright edge of the glass, said regulator means comprising a pair of swinging arms connected to the glass and one having a different travel than the other.

2. In a vehicle body having a side window opening, a window glass mounted therein, and regulator means for moving said glass downwardly and at the same time tilting the glass rearwardly to produce a ventilating slot at the forward edge of the glass, said regulator means comprising two swinging arms connected to the glass and operable at different speeds.

3. In a vehicle body having a side window opening, a window glass mounted therein, and a single regulator mechanism for swinging said glass in a downward direction to provide a ventilating slot at the forward upright edge of the glass, said regulator mechanism comprising a pair of arms connected to said glass, and gearing for moving said arms at different speeds in substantially the same direction for tilting the glass during its downward movement.

4. In a vehicle body having a side window opening, a window glass mounted therein, and a single regulator mechanism for swinging said glass in a downward direction to provide a ventilating slot at the forward upright edge of the glass, said regulator mechanism comprising a pair of pivoted arms releasably connected with the lower edge of said glass, and a plurality of intermeshing gears of different diameters associated with said arms for moving the arms in substantially the same direction at different speeds whereby to shift the glass angularly during its downward and upward travel.

5. In a vehicle body having a rear quarter window opening, a window glass mounted therein, a channel mounted upon the lower edge of said glass, and regulator mechanism connected to said channel at spaced points for shifting the glass downwardly and at the same time tilting the glass rearwardly in its plane to provide a variable ventilating slot at the forward edge of said glass.

6. In a vehicle body having a rear quarter window opening, a window glass mounted therein, and regulator means connected at spaced points to an edge of the glass for moving said glass downwardly and at the same time tilting the glass rearwardly to produce a ventilating slot at the forward edge of the glass.

JOHN H. ROETHEL.